(12) United States Patent
Jeong et al.

(10) Patent No.: US 12,206,131 B2
(45) Date of Patent: Jan. 21, 2025

(54) BATTERY MODULE COMPRISING BUS BAR PLATE, BATTERY PACK COMPRISING SAME, AND ELECTRONIC DEVICE

(71) Applicant: LG Energy Solution, Ltd., Seoul (KR)

(72) Inventors: Han-Yong Jeong, Daejeon (KR); Suk-Hoon Lee, Daejeon (KR); Young-Su Son, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 515 days.

(21) Appl. No.: 17/625,182

(22) PCT Filed: Aug. 13, 2020

(86) PCT No.: PCT/KR2020/010811
§ 371 (c)(1),
(2) Date: Jan. 6, 2022

(87) PCT Pub. No.: WO2021/060704
PCT Pub. Date: Apr. 1, 2021

(65) Prior Publication Data
US 2022/0320691 A1  Oct. 6, 2022

(30) Foreign Application Priority Data
Sep. 24, 2019 (KR) .......................... 10-2019-0117413

(51) Int. Cl.
*H01M 50/502* (2021.01)
*H01M 10/052* (2010.01)
(Continued)

(52) U.S. Cl.
CPC ....... *H01M 50/502* (2021.01); *H01M 10/052* (2013.01); *H01M 50/213* (2021.01);
(Continued)

(58) Field of Classification Search
None
See application file for complete search history.

(56) References Cited

U.S. PATENT DOCUMENTS

2013/0202941 A1   8/2013  Ono et al.
2014/0315055 A1* 10/2014  Byun ................... H01M 50/583
                                                          429/61
(Continued)

FOREIGN PATENT DOCUMENTS

JP    2014-146516 A    8/2014
JP    2014-229384 A   12/2014
(Continued)

OTHER PUBLICATIONS

International Search Report issued in corresponding International Patent Application No. PCT/KR2020/010811 dated Nov. 24, 2020.
(Continued)

*Primary Examiner* — Jonathan Crepeau
(74) *Attorney, Agent, or Firm* — Morgan, Lewis & Bockius LLP

(57) ABSTRACT

A battery module according to the present disclosure includes a plurality of cylindrical battery cells including a gas vent configured to discharge an internal gas and a busbar plate including a negative electrode connection terminal extending from an edge of a connection opening and having the extended part in contact with a negative electrode terminal to electrically connect the plurality of cylindrical battery cells wherein among a positive electrode connection terminal and the negative electrode connection terminal, the connection terminal in contact with a positive electrode terminal or a negative electrode terminal that is not opened by the gas vent includes a fuse portion configured to blow when a predetermined current or above flows from the
(Continued)

cylindrical battery cell, the fuse portion having a bent structure that is bent in a horizontal direction at least once.

14 Claims, 15 Drawing Sheets

(51) Int. Cl.
*H01M 50/213* (2021.01)
*H01M 50/30* (2021.01)
*H01M 50/342* (2021.01)
*H01M 50/559* (2021.01)
*H01M 50/578* (2021.01)
*H01M 50/581* (2021.01)
*H01M 50/583* (2021.01)

(52) U.S. Cl.
CPC ....... *H01M 50/30* (2021.01); *H01M 50/3425* (2021.01); *H01M 50/559* (2021.01); *H01M 50/578* (2021.01); *H01M 50/581* (2021.01); *H01M 50/583* (2021.01); *H01M 2220/20* (2013.01)

(56) References Cited

U.S. PATENT DOCUMENTS

| | | |
|---|---|---|
| 2015/0364744 A1 | 12/2015 | Takano et al. |
| 2016/0141573 A1 | 5/2016 | Aoki et al. |
| 2019/0109313 A1 | 4/2019 | Ryu et al. |
| 2020/0076022 A1 | 3/2020 | Kawakami et al. |
| 2020/0168887 A1 | 5/2020 | Yoo et al. |
| 2020/0227708 A1 | 7/2020 | Ahn et al. |

FOREIGN PATENT DOCUMENTS

| | | |
|---|---|---|
| JP | 6109926 B2 | 4/2017 |
| JP | 2017-084603 A | 5/2017 |
| JP | 2017-084606 A | 5/2017 |
| JP | 2018-037364 A | 3/2018 |
| JP | 6360092 B2 | 7/2018 |
| KR | 10-2018-0064221 A | 6/2018 |
| KR | 10-2018-0091446 A | 8/2018 |
| KR | 10-2019-0042990 A | 4/2019 |
| KR | 10-2019-0093008 A | 8/2019 |
| KR | 10-2019-0096674 A | 8/2019 |
| WO | 2012/164884 A1 | 12/2012 |
| WO | 2018/221004 A1 | 12/2018 |
| WO | 2019/139385 A1 | 7/2019 |

OTHER PUBLICATIONS

First Office Action issued in corresponding JP Patent Application No. 2021-570505, dated Dec. 23, 2022. Note: JP 2017-84603 and WO 2018/221004 cited therein are already of record.

Office Action issued in corresponding CN Patent Application No. 202080041474.4, dated Feb. 14, 2023.

* cited by examiner

BATTERY MODULE COMPRISING BUS BAR PLATE, BATTERY PACK COMPRISING SAME, AND ELECTRONIC DEVICE

TECHNICAL FIELD

The present disclosure relates to a battery module comprising a busbar plate, a battery pack comprising the same and an electronic device, and more particularly, to a battery module comprising a busbar plate for fast electrical disconnecting in the event of abnormal behavior (a short circuit) of a cylindrical battery cell.

The present application claims the benefit of Korean Patent Application No. 10-2019-0117413 filed on Sep. 24, 2019 with the Korean Intellectual Property Office, the disclosure of which is incorporated herein by reference in its entirety.

BACKGROUND ART

Recently, there has been a dramatic increase in demand for portable electronic products such as laptop computers, video cameras and mobile phones, and with the extensive development of electric vehicles, accumulators for energy storage, robots and satellites, many studies are being made on high performance secondary batteries that can be recharged repeatedly.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based batteries for their advantages that recharging can be done whenever it is convenient, the self-discharge rate is very low and the energy density is high.

A lithium secondary battery primarily uses a lithium-based oxide and a carbon material for a positive electrode active material and a negative electrode active material respectively. Additionally, the lithium secondary battery includes an electrode assembly including a positive electrode plate and a negative electrode plate respectively coated with the positive electrode active material and the negative electrode active material and a separator interposed between the positive electrode plate and the negative electrode plate, and a packaging or a battery case in which the electrode assembly is hermetically received together with an electrolyte solution.

The lithium secondary battery may be classified into a can-type secondary battery in which the electrode assembly is embedded in a metal can and a pouch-type secondary battery in which the electrode assembly is embedded in a pouch of an aluminum laminate sheet, according to the shape of the battery case.

In the can-type secondary battery, the metal can in which the electrode assembly is embedded may be cylindrical. The can-type secondary battery may be used to form a battery module including a housing to receive a plurality of secondary batteries and a busbar configured to electrically connect the plurality of secondary batteries.

Recently, in some cases, the busbar provided in the battery module uses a material having high electrical resistance to increase the resistance welding performance with the electrode terminal.

However, when a high current flows through the busbar in some of the plurality of secondary batteries embedded in the battery module due to an electrical short circuit between the secondary batteries, a failure may occur in products using the battery module. The current may be interrupted using a battery management system (BMS), but when the BMS operates abnormally or incorrectly, there is no solution to cope with the high current, causing a failure or a fire.

DISCLOSURE

Technical Problem

The present disclosure is designed to solve the above-described problem, and therefore the present disclosure is directed to providing a battery module comprising a busbar plate for fast electrical disconnecting in the event of abnormal behavior (a short circuit) of a cylindrical battery cell.

These and other objects and advantages of the present disclosure can be understood by the following description, and will be apparent from the embodiments of the present disclosure. In addition, it will be readily appreciated that the objects and advantages of the present disclosure can be realized by means and combinations thereof.

Technical Solution

To achieve the above-described object, a battery module according to the present disclosure includes a plurality of cylindrical battery cells arranged in a horizontal direction, some cylindrical battery cells each having a positive electrode terminal and a negative electrode terminal formed on top and bottom, the remaining cylindrical battery cells each having a negative electrode terminal and a positive electrode terminal formed on top and bottom, and including a gas vent through which the positive electrode terminal or the negative electrode terminal is opened to discharge an internal gas when an internal pressure is equal to or higher than a predetermined pressure, and a busbar plate including a body portion disposed on or below the plurality of cylindrical battery cells, and having a plate shape extending in the horizontal direction to cover the plurality of cylindrical battery cells, the body portion having at least one connection opening that is open in a vertical direction in an area in contact with the positive electrode terminal or the negative electrode terminal, a positive electrode connection terminal extending from an edge of the connection opening and having the extended part in contact with the positive electrode terminal to electrically connect the plurality of cylindrical battery cells, and a negative electrode connection terminal extending from the edge of the connection opening and having the extended part in contact with the negative electrode terminal to electrically connect the plurality of cylindrical battery cells.

Among the positive electrode connection terminal and the negative electrode connection terminal, the connection terminal in contact with the positive electrode terminal or the negative electrode terminal that is not opened by the gas vent may include a fuse portion configured to blow when a predetermined current or above flows from the cylindrical battery cell, the fuse portion having a bent structure that is bent in the horizontal direction at least once.

Additionally, the connection terminal may further include a connection portion in direct contact with the positive electrode terminal or the negative electrode terminal of the cylindrical battery cell, and the fuse portion may extend in the horizontal direction from the inner edge of the connection opening and an end in the extended direction may be connected to one end of the connection portion.

Additionally, the busbar plate may further include an electrically insulating first fixing member having one side connected to the inner edge of the connection opening and the other side connected to part of the connection portion to fix the connection portion.

Additionally, the busbar plate may further include an electrically insulating second fixing member having one side connected to the edge of the connection opening and the other side connected to part of the fuse portion to fix the fuse portion.

Additionally, at least part of a portion of the second fixing member extending from the edge of the connection opening to the part of the fuse portion may have elasticity to pull the fuse portion by elastic recovery when the fuse portion blows.

Additionally, the busbar plate may further include a thermal insulation member around an outer surface of the fuse portion.

Additionally, the thermal insulation element may be separated into at least two.

Additionally, the thermal insulation element may include a discharge hole configured to discharge a melted part of the fuse portion.

Additionally, the busbar plate may further include an electrically insulating reinforcement member around an outer surface of the fuse portion and is configured to melt at a predetermined temperature or above.

Additionally, at least part of the fuse portion having the reinforcement member may be bent in an arch shape.

Additionally, the battery module may further include a module housing having receiving portions with a plurality of hollows to receive the plurality of cylindrical battery cells arranged in rows and columns in the horizontal direction.

Additionally, among the plurality of cylindrical battery cells arranged in rows and columns, the fuse portion of the connection terminal in contact with the positive electrode terminal or the negative electrode terminal of the cylindrical battery cell disposed at an inner position in the horizontal direction may have a larger width than the fuse portion of the connection terminal in contact with the positive electrode terminal or the negative electrode terminal of the cylindrical battery cell disposed at an outer position in the horizontal direction.

Additionally, the bent structure may be bent in opposite directions at least twice.

Additionally, the body portion may further include an external terminal electrically connected to the plurality of cylindrical battery cells at least in an area in which the connection opening is not formed.

Additionally, the connection terminal may include at least two fuse portions, the at least two fuse portions may be spaced a predetermined distance apart from each other, and the at least two fuse portions may have different horizontal widths.

Additionally, to achieve the above-described object, a battery pack according to the present disclosure may include at least one battery module.

Additionally, to achieve the above-described object, an electronic device according to the present disclosure may include the battery pack.

Advantageous Effects

According to an aspect of the present disclosure, the battery module of the present disclosure includes the fuse portion in the connection terminal in contact with the positive electrode terminal or the negative electrode terminal that is not opened by the gas vent among the positive electrode connection terminal and the negative electrode connection terminal, the fuse portion configured to blow when a predetermined current or above flows from the cylindrical battery cell, to electrically isolate a specific cylindrical battery cell from the busbar plate when the high current flows in the specific cylindrical battery cell due to a short circuit between the plurality of cylindrical battery cells in the battery module. That is, it is possible to prevent a fire or thermal runaway in the battery module through the fuse portion. Accordingly, it is possible to increase the safety of the battery module.

Additionally, as the fuse portion is provided in the connection terminal in contact with the positive electrode terminal or the negative electrode terminal that is not opened by the gas vent, the electrode terminal that is not opened by the gas vent is disposed closer to the electrode assembly than the electrode terminal that is opened by the gas vent, and thus effectively receives the internal heat of the cylindrical battery cell, and accordingly the fuse portion may blow faster and more easily by the internal heat of the cylindrical battery cell.

Additionally, the fuse portion has the bent structure that is bent in the horizontal direction at least once, so it is easy to achieve a longer current path in the same space. That is, when the fuse portion extends linearly, it is necessary to form a larger connection opening, which places a space limitation on the electrical connection of one busbar plate with a larger number of cylindrical battery cells in a predetermined space. Accordingly, the present disclosure remarkably reduces the space occupied by the fuse portion of the busbar plate, thereby achieving the compact battery module.

Additionally, according to an aspect of another embodiment of the present disclosure, the busbar plate further includes the electrically insulating first fixing member having one side connected to the inner edge of the connection opening and the other side connected to part of the connection portion to fix the connection portion, in order to reduce the vibration of the connection portion when the battery module continuously vibrates by an external force. Accordingly, it is possible to effectively reduce the risk that the fuse portion may be cut or damaged by the continuous vibration.

BRIEF DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

DETAILED DESCRIPTION

Figure 1:
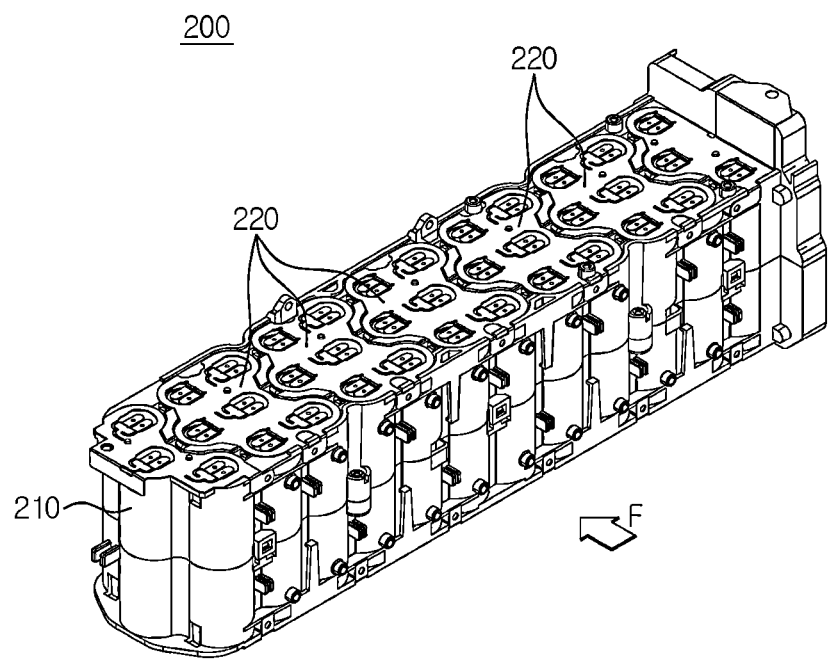
FIG. 1 is a schematic perspective view of a battery module according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

Figure 2:
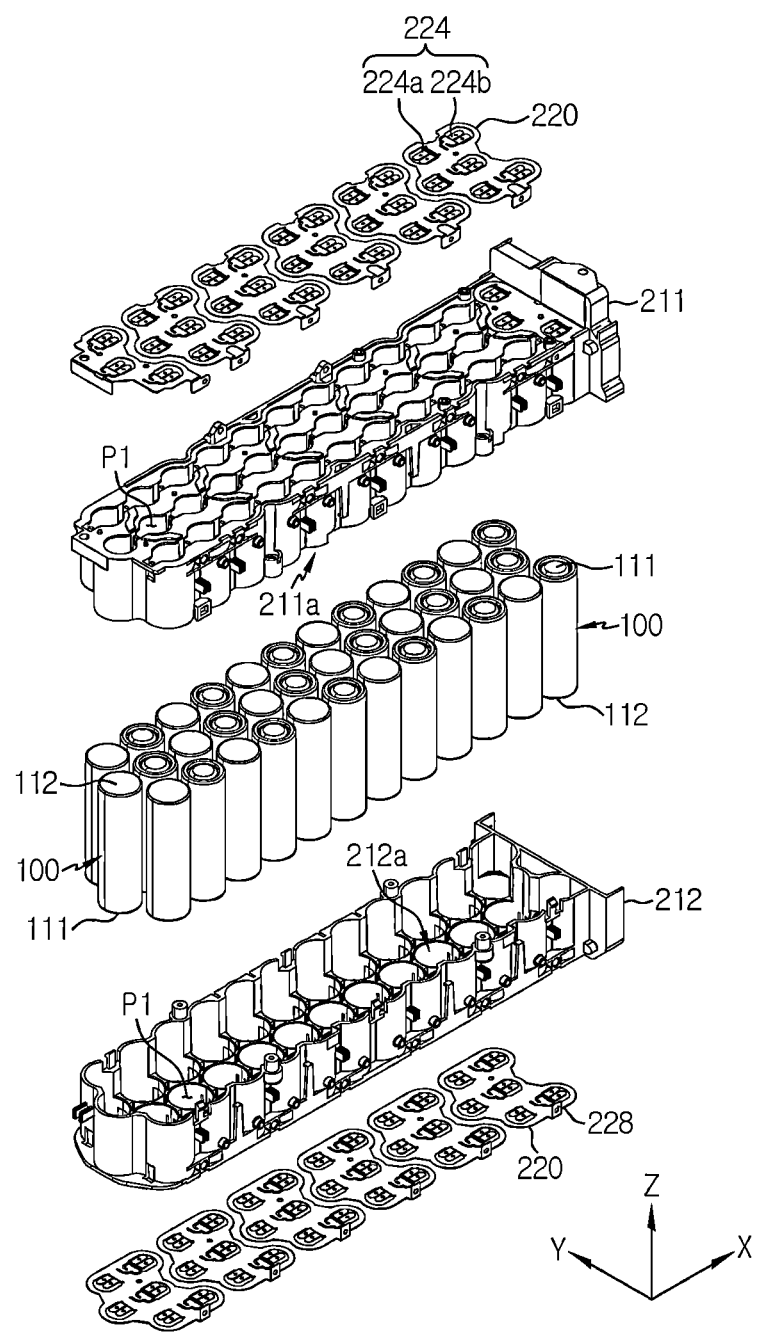
FIG. 2 is a schematic exploded perspective view of a battery module according to an embodiment of the present disclosure.
Figure 3:
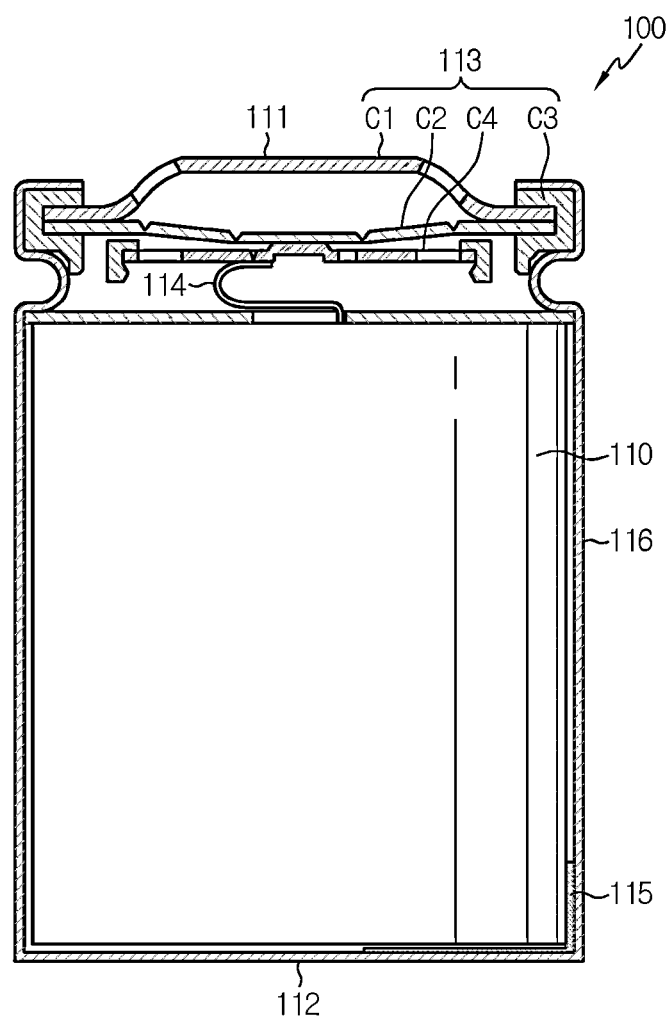
FIG. 3 is a schematic cross-sectional view of a cylindrical battery cell of a battery module according to an embodiment of the present disclosure.

FIG. 1 is a schematic perspective view of a battery module according to an embodiment of the present disclosure. FIG. 2 is a schematic exploded perspective view of the battery module according to an embodiment of the present disclosure. FIG. 3 is a schematic cross-sectional view of a cylindrical battery cell of the battery module according to an embodiment of the present disclosure.

Referring to FIGS. 1 to 3, the battery module 200 according to an embodiment of the present disclosure may include a plurality of cylindrical battery cells 100, a module housing 210 and a plurality of busbar plates 220.

Here, the cylindrical battery cell 100 may include a cylindrical battery can 116 and an electrode assembly (not shown) received in the battery can 116.

The battery can 116 may include a material having high electrical conductivity, and for example, the battery can 116 may include aluminum or copper.

The battery can 116 may be configured to stand upright in the vertical direction. The battery can 116 may be a cylindrical shape extending in the vertical direction. The electrode terminals 111, 112 may be formed on top and bottom of the battery can 116 respectively. In detail, the positive electrode terminal 111 may be formed on the flat circular upper surface on top of the battery can 116, and the negative electrode terminal 112 may be formed on the flat circular lower surface on bottom of the battery can 116.

The plurality of cylindrical battery cells 100 may be arranged in rows and columns in the horizontal direction. Here, the horizontal direction refers to a direction parallel to the ground when the cylindrical battery cell 100 is placed on the ground, and may be at least one direction on the plane perpendicular to the vertical direction. The horizontal direction may be X and Y directions of FIG. 2.

For example, as shown in FIG. 2, the battery module 200 includes 36 cylindrical battery cells 100 arranged in 3 rows in the front-rear direction (y direction in FIG. 2) and 12 columns in in the left-right direction (x direction). In this instance, among the plurality of cylindrical battery cells 100, 18 cylindrical battery cells may have the positive electrode terminal 111 and the negative electrode terminal 112 disposed on top and bottom respectively, and the remaining 18 cylindrical battery cells may have the negative electrode terminal 112 and the positive electrode terminal 111 disposed on top and bottom respectively.

The cylindrical battery cell 100 may include an electrode assembly 110, a battery can 116 and a cap assembly 113.

The electrode assembly 110 may have a structure in which a positive electrode plate and a negative electrode plate with a separator interposed between are wound, and the positive electrode plate may be connected to the cap assembly 113 with a positive electrode tab 114 attached to the positive electrode plate, and the negative electrode plate may be connected to the lower end of the battery can 116 with a negative electrode tab 115 attached to the negative electrode plate.

The battery can 116 may have an empty internal space to receive the electrode assembly 110. In particular, the battery can 116 may have a cylindrical or prismatic shape with an open top. The battery can 116 may be made of a metal such as steel or aluminum to ensure stiffness. The battery can 116 may have the negative electrode tab attached to the lower end, and not only the lower part of the battery can 116 but also the battery can 116 itself may act as the negative electrode terminal 112.

The cap assembly 113 may be coupled to the top opening of the battery can 116 to hermetically close the open end of the battery can 116. The cap assembly 113 may have a circular or prismatic shape according to the shape of the battery can 116, and may include subcomponents such as a top cap C1, a gas vent C2 and a gasket C3.

Here, the top cap C1 may be disposed on the outermost side of the cap assembly 113, and extend in the upward direction. In particular, the top cap C1 may act as the positive electrode terminal 111 of the cylindrical battery cell 100. Accordingly, the top cap C1 may be electrically connected to other cylindrical battery cell 100, a load or a charger through an external device, for example, the busbar plate 220. The top cap C1 may be made of a metal such as, for example, stainless steel or aluminum.

The gas vent C2 may be configured to change the shape when the internal pressure of the cylindrical battery cell 100, i.e., the internal gas pressure of the battery can 116 is equal to or higher than a predetermined pressure. For example, when the internal gas of the battery can 116 may be discharged through the gas vent C2, the top cap C1 may be opened. That is, the positive electrode terminal 111 or the negative electrode terminal 112 may be opened through the gas vent C2. For example, the gas vent C2 may be configured to break in part by the internal gas pressure of the battery can 116. Through the broken portion of the gas vent C2, the internal gas may be discharged. In this instance, the gas may be discharged through a hole formed in the peripheral area of the positive electrode terminal 111.

The gasket C3 may be made of an electrically insulating material to insulate the circumferential area of the top cap C1 and the gas vent C2 from the battery can 116.

The cap assembly 113 may further include a current interrupt element C4. The current interrupt element C4 may be referred to as a Current Interrupt Device (CID), and when the shape of the gas vent C2 is changed by the increased internal pressure of the battery due to the gas generation, the contact between the gas vent C2 and the current interrupt element C4 is separated or the current interrupt element C4 is broken, causing disconnection of the electrical connection between the gas vent C2 and the electrode assembly 110.

The configuration of the cylindrical battery cell 100 is well known to those skilled in the art at the time of filing the patent application, and its detailed description is omitted herein. Although FIG. 3 shows an example of the cylindrical battery cell 100, the battery module 200 according to the present disclosure is not limited to a specific type of cylindrical battery cell 100. That is, various types of secondary batteries known at the time of filing the patent application may be used in the battery module 200 according to the present disclosure.

The module housing 210 may include an upper case 211 and a lower case 212.

The upper case 211 and the lower case 212 may have receiving portions 211a, 212a in which the cylindrical battery cell 100 is inserted and received respectively. In detail, each of the receiving portions 211a, 212a may have a plurality of hollows P1 around the outer surface of the cylindrical battery cell 100.

The module housing 210 may include an electrically insulating plastic. The plastic may be, for example, polyvinyl chloride, nylon or polyethylene terephthalate.

Here, the terms representing the directions such as front, rear, left, right, up, and down may vary depending on the position of the observer or the placement of the object. However, in the specification, for convenience of description, the directions such as front, rear, left, right, up, and down are defined when viewed from the direction F.

Figure 4:
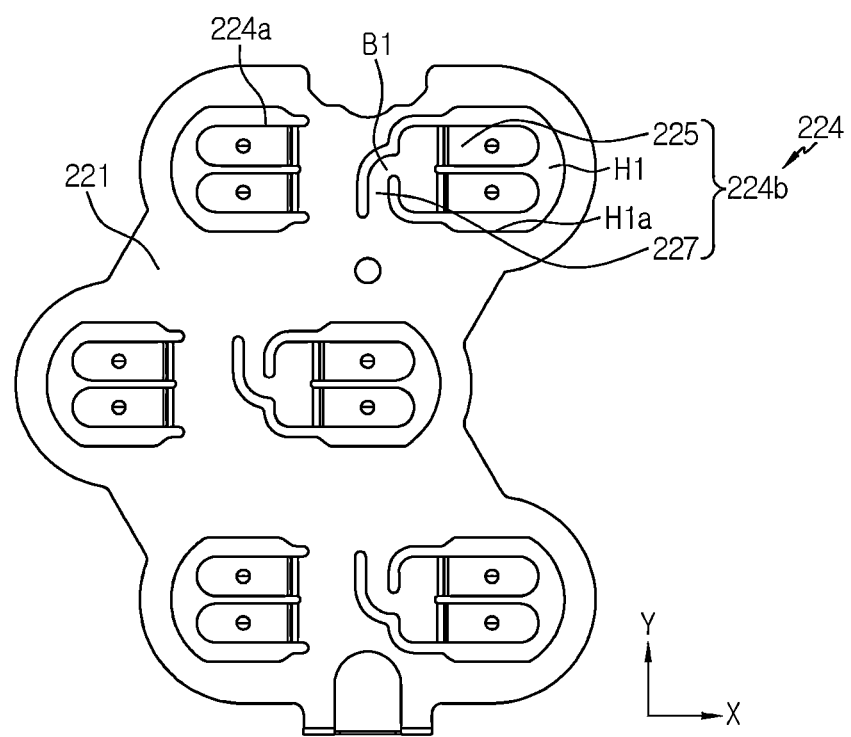
FIG. 4 is a schematic plane view of a busbar plate of a battery module according to an embodiment of the present disclosure.

FIG. 4 is a schematic plane view of the busbar plate of the battery module according to an embodiment of the present disclosure.

Referring to FIG. 4 together with FIG. 2, the busbar plate 220 may be, on one surface, electrically connected in contact with the electrode terminals 111, 112 of at least two of the plurality of cylindrical battery cells 100. That is, the busbar plate 220 may be configured to come into contact with the positive electrode terminal 111 or the negative electrode terminal 112 of the plurality of cylindrical battery cells 100 to electrically connect the plurality of cylindrical battery cells 100.

In detail, the busbar plate 220 may include a body portion 221 and a connection terminal 224. In this instance, the connection terminal 224 may include a positive electrode connection terminal 224a configured to be connected to a positive electrode terminal 111 and a negative electrode connection terminal 224b configured to be connected to a negative electrode terminal 112.

Here, the body portion 221 may have a plate shape that is flat in the horizontal direction to cover the plurality of cylindrical battery cells 100. In other words, the body portion 221 may have a plate shape having the upper and lower surfaces that are wider than the horizontal sides (x direction, y direction). The body portion 221 may be disposed on top or bottom of the plurality of cylindrical battery cells 100 where the positive electrode terminal 111 or the negative electrode terminal 112 is formed. The body portion 221 and the connection terminal 224 may include an electrically conductive metal to electrically connect the plurality of cylindrical battery cells 100. The electrically conductive metal may be an alloy of nickel, copper, aluminum.

An external terminal 228 electrically connected to the plurality of cylindrical battery cells 100 may be provided at least in an area of the body portion 221 in which the connection opening H1 is not formed. The external terminal 228 may be configured to be electrically connected to a battery management system (not shown). Alternatively, the external terminal 228 may be electrically connected to other busbar plate 220 of the battery module 200.

The body portion 221 may have at least one connection opening H1 that is open in the vertical direction. The connection opening H1 may be open in the vertical direction at an area facing the positive electrode terminal 111 or the negative electrode terminal 112.

The positive electrode connection terminal 224a may extend from an edge H1a of the connection opening H1, and the extended portion may come into contact with the positive electrode terminal 111 to electrically connect the plurality of cylindrical battery cells 100.

The negative electrode connection terminal 224b may extend from the edge H1a of the connection opening H1, and the extended portion may come into contact with the negative electrode terminal 112 to electrically connect the plurality of cylindrical battery cells 100.

For example, as shown in FIG. 4, one busbar plate 220 of the present disclosure may include the body portion 221 of a plate shape that is flat in the horizontal direction, 3 positive electrode connection terminals 224a, and 3 negative electrode connection terminals 224b.

The positive electrode connection terminal 224a and the negative electrode connection terminal 224b may extend in the horizontal direction from the edge H1a of the connection opening H1. That is, the positive electrode connection terminal 224a and the negative electrode connection terminal 224b may be disposed in the connection opening H1.

Among the positive electrode connection terminal 224a and the negative electrode connection terminal 224b, the connection terminal 224b in contact with the positive electrode terminal 111 or the negative electrode terminal 112 that is no opened by the gas vent C2 may include a fuse portion 227. The fuse portion 227 may be configured to blow when a predetermined current or above flows from the cylindrical battery cell 100. That is, when the predetermined current or above flows, part of the fuse portion 227 may be melted and lost by the resistance heat. By this principle, the fuse portion 227 may be electrically disconnected.

The fuse portion 227 may have a bent structure B1 bent in the horizontal direction at least once. For example, as shown in FIG. 4, the fuse portion 227 may have the bent structure B1 in which the fuse portion 227 extends in the front-rear direction (y direction) from the edge H1a of the connection opening H1, and the extended end is bent again in the right direction (x direction).

According to this configuration of the present disclosure, among the positive electrode connection terminal 224a and the negative electrode connection terminal 224b, the connection terminal 224 in contact with the positive electrode terminal 111 or the negative electrode terminal 112 that is not opened by the gas vent C2 includes the fuse portion 227 configured to blow when the predetermined current or above flows from the cylindrical battery cell 100, causing a short circuit between the plurality of cylindrical battery cells 100 in the battery module 200, so that the specific cylindrical battery cell 100 may be electrically isolated from the busbar plate 220 by the fuse portion 227 when the high current flows in the specific cylindrical battery cell 100. That is, it is possible to prevent a fire or thermal runaway in the battery module 200 through the fuse portion 227. Accordingly, it is possible to increase the safety of the battery module 200.

As the fuse portion 227 is provided in the connection terminal 224 in contact with the positive electrode terminal 111 or the negative electrode terminal 112 that is not opened by the gas vent C2, the electrode terminal (e.g., the negative electrode terminal) that is not opened by the gas vent C2 is disposed closer to the electrode assembly than the electrode terminal that is opened by the gas vent C2, and thus effectively receives the internal heat of the cylindrical battery cell 100, thereby causing the internal heat of the cylindrical battery cell 100 to blow the fuse portion 227 faster and more easily.

The fuse portion 227 has the bent structure B1 that is bent in the horizontal direction at least once, so it is easier to achieve a longer current path in the same space. That is, when the fuse portion 227 extends linearly, it is necessary to form a larger connection opening H1, which places a space limitation on the electrical connection of one busbar plate 220 with a larger number of cylindrical battery cells 100 in a predetermined space. Accordingly, the present disclosure remarkably reduces the space occupied by the fuse portion 227 of the busbar plate 220, thereby achieving the compact battery module 200.

Referring back to FIG. 4, in more detail, each of the positive electrode connection terminal 224a and the negative electrode connection terminal 224b may further include a connection portion 225 in direct contact with or welded to the positive electrode terminal 111 and the negative electrode terminal 112 of the cylindrical battery cell 100 respectively.

The connection portion 225 may have a branched structure branched into two in the horizontal direction. The branched structure may help the resistance welding of the positive electrode terminal 111 or the negative electrode terminal 112 and the connection portion 225. A welding point is provided in each of the two branches of the branched structure, and a welding rod (not shown) comes into contact with the welding point.

The fuse portion 227 may have a structure in which the fuse portion 227 extends in the horizontal direction from the inner edge H1a of the connection opening H1 and the end of the extended direction is connected to one end of the connection portion 225.

Figure 5:
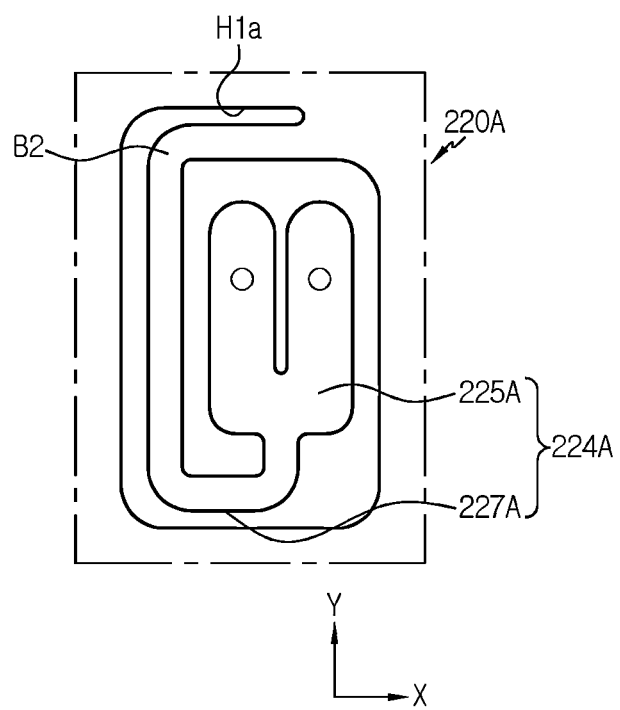
FIG. 5 is a schematic partial plane view of a connection terminal of a busbar plate of a battery module according to another embodiment of the present disclosure.

FIG. 5 is a schematic partial plane view of the connection terminal of the busbar plate of the battery module according to another embodiment of the present disclosure.

Referring to FIG. 5, the busbar plate 220A according to another embodiment of the present disclosure may have a bent structure B2 in which a fuse portion 227A of the connection terminal 224A is bent in the horizontal direction three times. For example, as shown in FIG. 5, the fuse portion 227A may have the bent structure B2 in which the fuse portion 227A extends in the left direction (the negative direction of x coordinate) from the edge H1a of the connection opening H1, the extended end is bent forward (the negative direction of y coordinate) again, the bent end is bent to the right again, and the bent end is bent rearward (the positive direction of y coordinate) again. That is, the fuse portion 227A may be bent at 270° rotation.

Accordingly, the connection terminal 224A of the busbar plate 220A according to another embodiment of the present disclosure has the bent structure B2 that is bent three times, and thus is easy to design a longer length of the fuse portion 227A when compared to the bent structure (B1 in FIG. 4) in which the connection terminal 224 of the busbar plate 220 of FIG. 4 is bent once. That is, as the length of the fuse portion 227A is longer, the electrical resistance of the fuse portion 227A is higher, and thus even though the width of the fuse portion 227A is set wide, high resistance easily blows the fuse portion 227A due to the large length.

Figure 6:
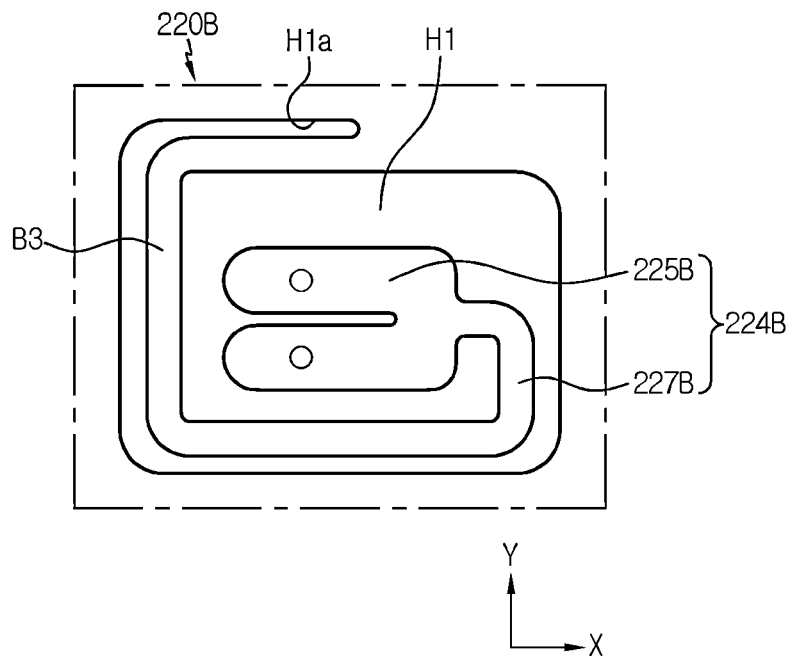
FIG. 6 is a schematic partial plane view of a connection terminal of a busbar plate of a battery module according to another embodiment of the present disclosure.

FIG. 6 is a schematic partial plane view of the connection terminal of the busbar plate of the battery module according to another embodiment of the present disclosure.

Referring to FIG. 6, the busbar plate 220B according to another embodiment of the present disclosure may have a bent structure B3 in which a fuse portion 227B of the connection terminal 224B is bent in the horizontal direction four times. For example, as shown in FIG. 6, the fuse portion 227B may have the bent structure B3 in which the fuse portion 227B extends in the left direction (negative direction of x coordinate) from the edge H1a of the connection opening H1, the extended end is bent forward (the negative direction of y coordinate) again, the bent end is bent to the right (x axis direction) again, the bent end is bent forward (y axis direction) again, and the bent end is bent to the left (the negative direction of x coordinate) again. That is, the fuse portion 227B may be bent 360° rotation.

Accordingly, the connection terminal 224B of the busbar plate 220B according to another embodiment of the present disclosure has the bent structure B3 that is bent four times, and thus is easy to design a longer length of the fuse portion 227B compared to the bent structure in which the fuse portion 227A of the connection terminal 224 of the busbar plate 220B of FIG. 5 is bent three times. That is, as the length of the fuse portion 227B is longer, the electrical resistance of the fuse portion 227B is higher, and thus even though the width of the fuse portion 227B is set wide, high resistance easily blows the fuse portion 227B due to the large length.

Figure 7:
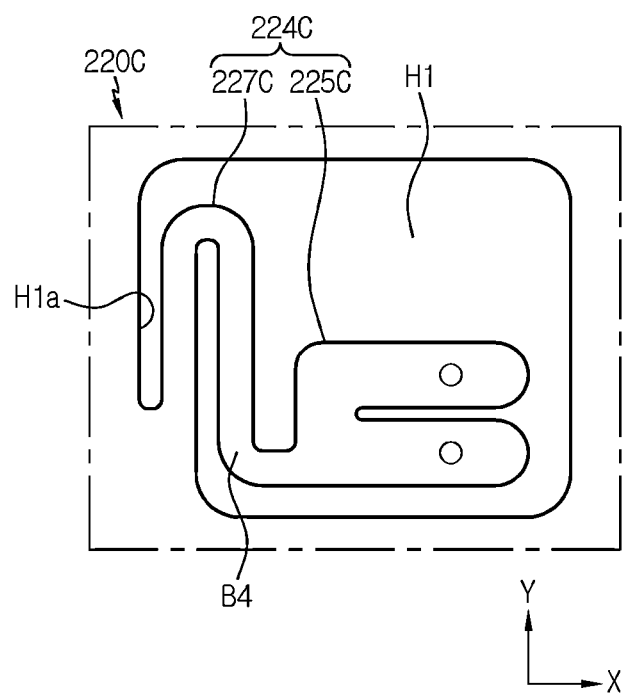
FIG. 7 is a schematic partial plane view of a connection terminal of a busbar plate a battery module according to another embodiment of the present disclosure.

FIG. 7 is a schematic partial plane view of the connection terminal of the busbar plate of the battery module according to another embodiment of the present disclosure.

Referring to FIG. 7, the busbar plate 220C according to another embodiment of the present disclosure may have a bent structure B4 in which a fuse portion 227C of the connection terminal 224C is bent in the horizontal direction at least three times. In this instance, the bent structure B4 bent at least three times may be bent in the opposite directions at least twice.

For example, as shown in FIG. 7, the busbar plate 220C according to another embodiment of the present disclosure may have the bent structure B4 in which the fuse portion 227C extends rearward (the positive direction of y coordinate) from the edge H1a of the connection opening H1, the extended end is bent forward (the negative direction of y coordinate) again, and the bent end is bent to the right (x axis direction) again. That is, the fuse portion 227C may have the bent structure B4 that is bent forward and rearward in an alternating manner at least once.

According to this configuration of the present disclosure, as the bent structure B4 of the fuse portion 227C of the connection terminal 224C is bent in the opposite directions at least twice, the fuse portion 227C may have a bent portion bent in a direction and a bent portion bent in the other direction, adjacent to each other. In this structure, the temperature of the fuse portion 227C may increase rapidly by the heat exchange between the adjacent bent portions when the high current flows. Accordingly, the fuse portion 227C of the present disclosure may blow faster.

Figure 8:
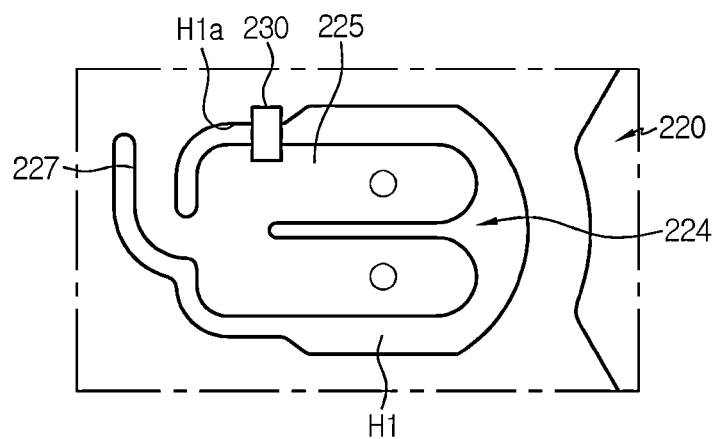
FIG. 8 is a schematic partial plane view of a busbar plate of a battery module according to another embodiment of the present disclosure.

FIG. 8 is a schematic partial plane view of the busbar plate of the battery module according to another embodiment of the present disclosure.

Referring to FIG. 8, the busbar plate 220 may further include a first fixing member 230.

In detail, the first fixing member 230 may be configured to fix the connection portion 225. The first fixing member 230 may include an electrically insulating material. For example, the first fixing member 230 may be plastic (polyimide) having high heat resistance, or a nonconductive material, for example, stainless steel, solidified silicone or rubber. The first fixing member 230 may have one side connected to the inner edge H1a of the connection opening H1 and the other side connected to part of the connection portion 225.

According to this configuration of the present disclosure, the busbar plate 220 further includes the electrically insulating first fixing member 230 having one side connected to the inner edge H1a of the connection opening H1 and the other side connected to part of the connection portion 225 to fix the connection portion 225, in order to reduce the vibration of the connection portion 225 when the battery module 200 continuously vibrates by an external force. Accordingly, it is possible to effectively reduce the risk that the fuse portion 227 may be cut or damaged by the continuous vibration.

When the fuse portion 227 is blown by the high current, the first fixing member 230 fixes the connection portion 225 of the connection terminal 224, to prevent a short circuit from occurring between the connection portion 225 and other cylindrical battery cell 100 by the movement of the connection portion 225 due to an external force.

Figure 9:
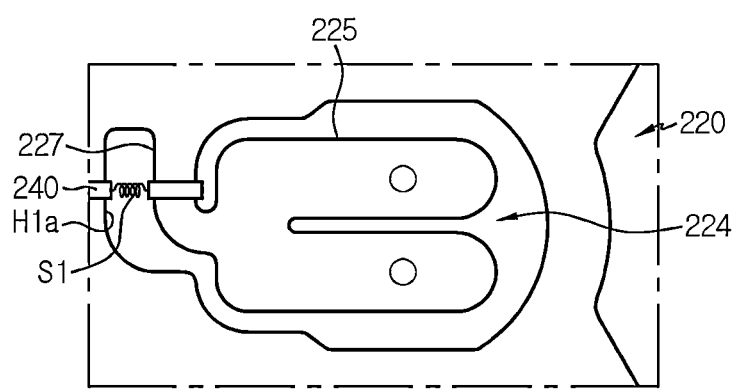
FIG. 9 is a schematic partial plane view of a busbar plate of a battery module according to another embodiment of the present disclosure.

FIG. 9 is a schematic partial plane view of the busbar plate of the battery module according to another embodiment of the present disclosure.

Referring to FIG. 9, the busbar plate 220 may further include a second fixing member 240 configured to fix the fuse portion 227. The second fixing member 240 may have one side connected to the edge H1a of the connection opening H1 and the other side connected to part of the fuse portion 227. The second fixing member 240 may include an electrically insulating material. For example, the electrically insulating material may be plastic (polyimide) having high heat resistance, or a nonconductive material, for example, stainless steel, solidified silicone or rubber.

The second fixing member 240 may have one side connected to the inner edge H1a of the connection opening H1 and the other side connected to the fuse portion 227. In more detail, one side of the second fixing member 240 may be attached around the edge H1a. The other side of the second fixing member 240 may have a tube shape and may be configured to wrap around the part of the fuse portion 227. The second fixing member 240 may extend such that the second fixing member 240 is connected to the inner edge H1a of the connection opening H1 on one side of the tube shape that wraps around the fuse portion 227.

The extended end of the second fixing member 240 may be configured to wrap around the part of the inner edge H1a of the connection opening H1. That is, the extended end may be in close contact with the upper surface and the lower surface of the part of the inner edge H1a of the connection opening H1. That is, the extended end may have a sandwiched structure with the edge H1a. In this instance, the extended end may be in solidified state.

According to this configuration of the present disclosure, the busbar plate 220 further includes the electrically insulating second fixing member 240 having one side connected to the edge H1a of the connection opening H1 and the other side connected to part of the fuse portion 227 to fix the fuse portion 227, in order to reduce the vibration of the fuse portion 227 when the battery module 200 continuously vibrates by an external force. Accordingly, it is possible to effectively reduce the risk that the fuse portion 227 may be cut or damaged by the continuous vibration.

Referring back to FIG. 9, at least part of the portion of the second fixing member 240 extending from the edge H1a of the connection opening H1 to part of the fuse portion 227 may have elasticity. When the fuse portion 227 blows, the second fixing member 240 may be configured to pull the fuse portion 227 by the elastic recovery. For example, at least part of the second fixing member 240 may have a spring structure (a spiral structure, S1). The second fixing member 240 may have one side connected to the edge H1a of the connection opening H1 and the other side connected to part of the fuse portion 227.

According to this configuration of the present disclosure, as at least part of the portion of the second fixing member 240 extending from the edge H1a of the connection opening H1 to the part of the fuse portion 227 has elasticity, the second fixing member 240 is configured to pull the fuse portion 227 by the elastic recovery when the fuse portion 227 blows, and thus when the fuse portion 227 is blown by the high current, the fuse portion 227 may be separated from the connection portion 225 with higher reliability by the elasticity of the second fixing member 240.

Figure 10:
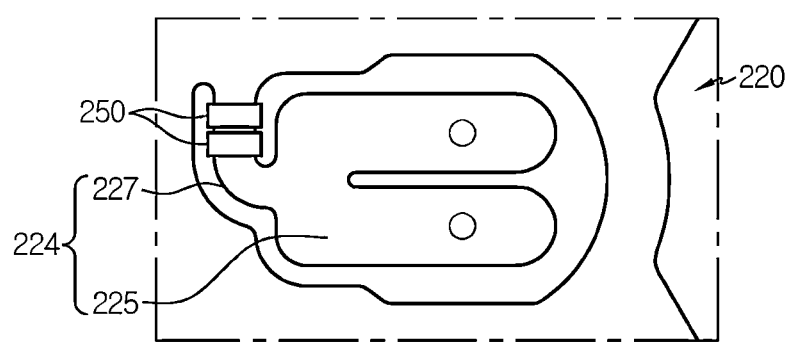
FIG. 10 is a schematic partial plane view of a thermal insulation member and a connection terminal of a battery module according to another embodiment of the present disclosure.

FIG. 10 is a schematic partial plane view of a thermal insulation member and the connection terminal of the battery module according to another embodiment of the present disclosure.

Referring to FIG. 10, the busbar plate 220 may further include the thermal insulation member 250 around the outer surface of the fuse portion 227. The thermal insulation member 250 may include a thermally insulating material having relatively low thermal conductivity. The thermally insulating material may be a glass fiber or foamed plastic. For example, the thermal insulation member 250 may have a tube shape that wraps around the upper surface, the horizontal side and the lower surface of the fuse portion 227.

According to this configuration of the present disclosure, the busbar plate 220 further includes the thermal insulation member 250 around the outer surface of the fuse portion 227, to prevent heat from being discharged when the fuse portion 227 is melted by the high current, thereby increasing the temperature of the fuse portion 227 to blow the fuse portion 227 faster.

As the thermal insulation member 250 wraps around the outer surface of the fuse portion 227, it is possible to prevent the melted part of the fuse portion 227 from moving to other internal component (e.g., the cylindrical battery cell), an electrical short circuit, or damage to other internal component.

Referring back to FIG. 10, the thermal insulation member 250 may be separated into at least two. For example, as shown in FIG. 10, the thermal insulation member 250 separated into two may be disposed on the fuse portion 227.

According to this configuration of the present disclosure, as the thermal insulation member 250 is separated into at least two, the melted part of the fuse portion 227 may be induced to escape between the at least two separated portions of the thermal insulation member 250 when the fuse portion 227 is blown by the high current. The thermal insulation member 250 separated into at least two does not hinder the separation of the fuse portion 227 into two, thereby effectively blowing the fuse portion 227.

Figure 11:
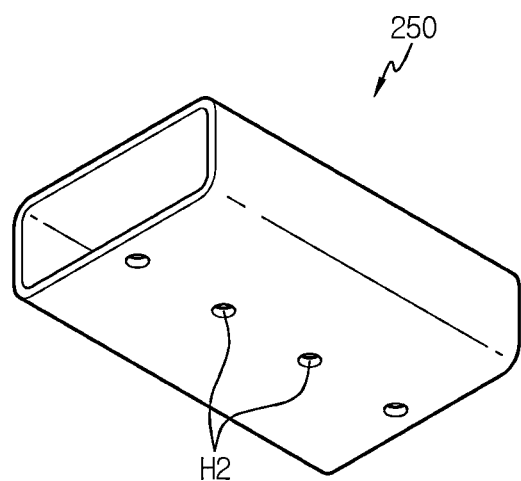
FIG. 11 is a schematic bottom perspective view of a reinforcement member of a battery module according to another embodiment of the present disclosure.

FIG. 11 is a schematic bottom perspective view of a reinforcement member of the battery module according to another embodiment of the present disclosure.

Referring to FIG. 11 together with FIG. 10, the thermal insulation member 250 of FIG. 11 may further include a discharge hole H2 to discharge the melted part of the fuse portion 227. For example, as shown in FIG. 11, the thermal insulation member 250 may include four discharge holes H2 on bottom to discharge the melted part of the fuse portion 227.

According to this configuration of the present disclosure, the thermal insulation member 250 includes the discharge hole H2 to discharge the melted part of the fuse portion 227, so that the melted part of the fuse portion 227 may be induced to be discharged through the discharge hole H2 of the thermal insulation member 250 when the fuse portion 227 is blown by the high current. Accordingly, it is possible to effectively remove the melted part of the fuse portion 227, thereby effectively blowing the fuse portion 227.

Figure 12:
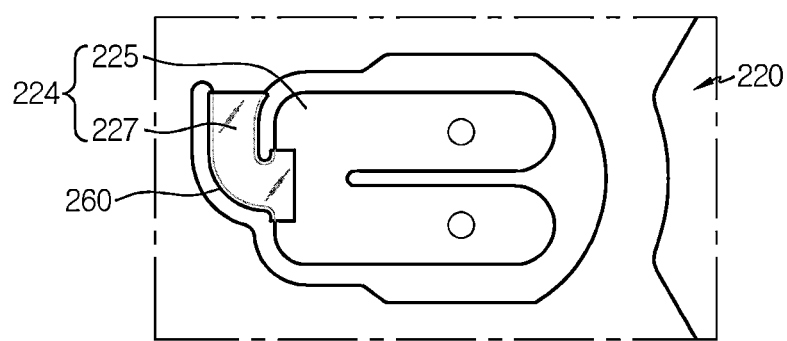
FIG. 12 is a schematic partial plane view of a busbar plate of a battery module according to another embodiment of the present disclosure.

FIG. 12 is a schematic partial plane view of the busbar plate of the battery module according to another embodiment of the present disclosure.

Referring to FIG. 12, the busbar plate 220 of FIG. 12 may include a reinforcement member 260 around the outer surface the fuse portion 227. The reinforcement member 260 may be configured to melt at a predetermined temperature or above. For example, the predetermined temperature may be 300° or above. The reinforcement member 260 may include an electrically insulating material. For example, the electrically insulating material may be Teflon®. The reinforcement member 260 in melt state (in resin state) may be coated on the outer surface of the fuse portion 227 and then cured. The curing method may include low temperature curing and ultraviolet curing.

According to this configuration of the present disclosure, the busbar plate 220 further includes the electrically insulating reinforcement member 260 configured to melt at the predetermined temperature or above around the outer surface of the fuse portion 227, to reinforce the mechanical strength of the fuse portion 227. Accordingly, when the battery module 200 of the present disclosure continuously vibrates by an external force, it is possible to effectively reduce the risk that the fuse portion 227 may be cut or damaged by the continuous vibration.

Figure 13:
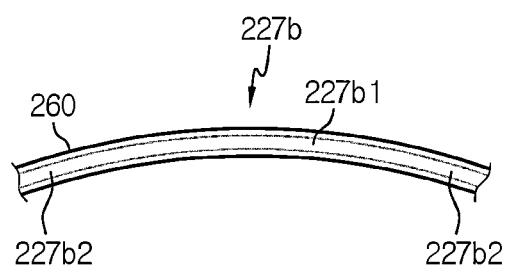
FIG. 13 is a schematic partial side view of a busbar plate of a battery module according to another embodiment of the present disclosure.

FIG. 13 is a schematic partial side view of the busbar plate of the battery module according to another embodiment of the present disclosure. For convenience of description, only part of the fuse portion 227B of the connection terminal 224 is shown in FIG. 13.

At least part of the fuse portion 227B having the reinforcement member 260 may be bent in an arch shape. Here, the arch shape refers to the shape of the fuse portion 227B having the central area 227b1 disposed at a higher position and two ends 227b2 disposed at a lower position. That is, when a part (in particular, the central area) of the fuse portion 227B is blown by the arch shape, the separated two parts may spread apart due to the elasticity.

According to this configuration of the present disclosure, as at least part of the fuse portion 227B having the reinforcement member 260 is bent in an arch shape, the blown part of the fuse portion 227B may be effectively separated by the elasticity of the arch shape, thereby effectively increasing the blowing reliability.

Figure 14:
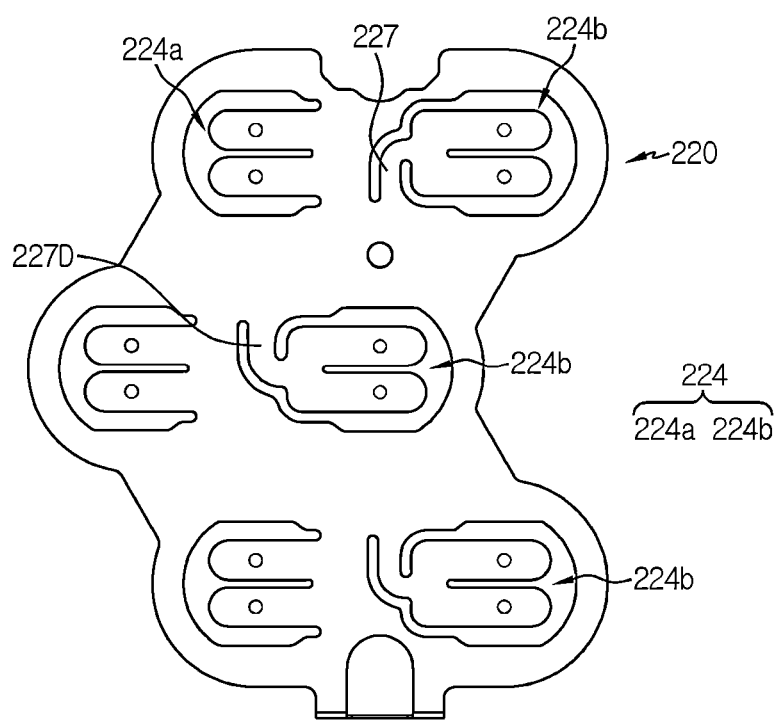
FIG. 14 is a schematic plane view of a busbar plate of a battery module according to another embodiment of the present disclosure.

FIG. 14 is a schematic plane view of the busbar plate of the battery module according to another embodiment of the present disclosure.

Referring to FIG. 14 together with FIG. 2, among the plurality of cylindrical battery cells 100 arranged in rows and columns, the fuse portion 227 of the connection terminal 224 in contact with the positive electrode terminal 111 or the negative electrode terminal 112 of the cylindrical battery cell 100 disposed at the inner position in the horizontal direction may have a larger width than the fuse portion 227 of the connection terminal 224 in contact with the positive electrode terminal 111 or the negative electrode terminal 112 of the cylindrical battery cell 100 disposed at the outer position in the horizontal direction.

That is, the fuse portion 227 of the connection terminal 224 disposed at the inner position in the horizontal direction may have a larger vertical cross sectional area than the fuse portion 227 of the connection terminal 224 disposed at the outer position in the horizontal direction.

The fuse portion 227 of the connection terminal 224 may have the cross section set considering the thermal balance of the plurality of cylindrical battery cells 100 horizontally arranged in rows and columns, inserted and received in the module housing 210.

In other words, during charging and discharging of the battery module 200, among the plurality of cylindrical battery cells 100, the cylindrical battery cell 100 disposed at the inner position in the horizontal direction may have higher temperature than the cylindrical battery cell 100 disposed at the outer position. Accordingly, the fuse portion 227 of the connection terminal 224 connected to the positive electrode terminal 111 or the negative electrode terminal 112 of the cylindrical battery cell 100 disposed at the inner position in the horizontal direction may have lower electrical resistance.

For example, as shown in FIG. 14, one busbar plate 220 may have 6 connection terminals 224. Among the 6 connection terminals 224, the fuse portion 227 may be provided in each of 3 negative electrode connection terminals 224b connected to the negative electrode terminal 112. In this instance, among the 3 negative electrode connection terminals 224b, the width of the fuse portion 227D of the negative electrode connection terminal 224b disposed at the inner position in the horizontal direction may be larger than the width of the fuse portion 227 of the negative electrode connection terminal 224b disposed at the outer position in the front-rear direction.

That is, the fuse portion 227D of the connection terminal 224 disposed at the inner position in the horizontal direction may have a larger width than the fuse portion 227 of the connection terminal 224 disposed at the outer position in the horizontal direction.

According to this configuration of the present disclosure, among the plurality of cylindrical battery cells 100 arranged in rows and columns, the fuse portion 227D of the connection terminal 224 in contact with the positive electrode terminal 111 or the negative electrode terminal 112 of the cylindrical battery cell 100 disposed at the inner position in the horizontal direction has a larger width than the fuse portion 227 of the connection terminal 224 in contact with the positive electrode terminal 111 or the negative electrode terminal 112 of the cylindrical battery cell 100 disposed at the outer position in the horizontal direction, to prevent a disconnection from occurring at or below the current value set to blow the fuse portion 227 due to high temperature at the center of the battery module 200. Accordingly, it is possible to prevent a malfunction such as a short circuit occurring when the cylindrical battery cell 100 does not abnormally operate during the use of the battery module 200.

Figure 15:
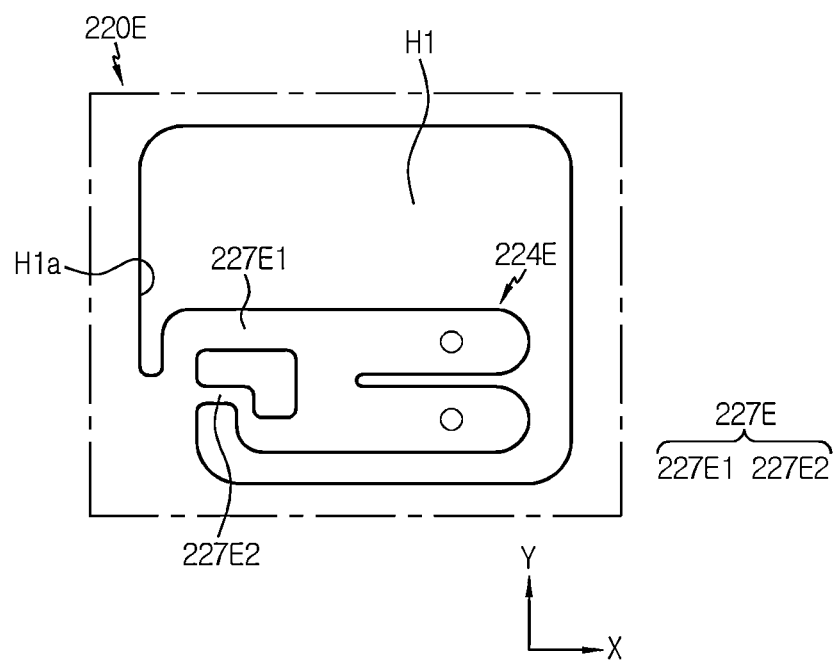
FIG. 15 is a schematic partial plane view of a connection terminal of a busbar plate of a battery module according to another embodiment of the present disclosure.

FIG. 15 is a schematic partial plane view of the connection terminal of the busbar plate of a battery module according to another embodiment of the present disclosure.

Referring to FIG. 15, as opposed to the connection terminal 224 of FIG. 4, the connection terminal 224E of the busbar plate 220E of FIG. 15 may include at least two fuse portions 227E. In this instance, the at least two fuse portions 227E may be spaced a predetermined distance apart from each other. In this instance, the at least two fuse portions 227E may have different horizontal widths.

For example, among the at least two fuse portions 227E, the fuse portion having a larger width is defined as a first fuse portion 227E1, and the first fuse portion 227E1 may be configured to melt and blow at the predetermined current required to protect the battery module of the present disclosure. The fuse portion 227E having a smaller width is defined as a second fuse portion 227E2, and the second fuse portion 227E2 may melt at a lower current than the first fuse portion 227E1. The electrical resistance of the first fuse portion 227E1 may be lower than that of the second fuse portion 227E2.

That is, for example, while the battery module normally operates, the predetermined current or above may flow through the first fuse portion 227E1 having lower electrical resistance. Subsequently, when the predetermined high current or above flows in the first fuse portion 227E1 due to the abnormal behavior of the cylindrical battery cell 100 in the connection terminal 224, the first fuse portion 227E1 melts and blows, and the remaining second fuse portion 227E2 also blows by the high current. Accordingly, the fuse portion of the present disclosure may interrupt the current with higher reliability.

According to this configuration of the present disclosure, compared to the fuse portion 227 of FIG. 4 including only one fuse portion 227, the connection terminal 224 includes at least two fuse portions 227E having different widths spaced the predetermined distance apart from each other, thereby increasing the durability of the connection terminal 224.

A battery pack (not shown) according to an embodiment of the present disclosure may include at least one battery module 200. The battery pack may further include various types of devices (not shown) such as a BMS, a current sensor and a fuse to control the charge/discharge of the battery module 200.

Ann electronic device (not shown) according to an embodiment of the present disclosure includes at least one battery module 200. The electronic device may further include to a device housing (not shown) having a space for receiving the battery module 200 and a display to allow the user to see the state of charge of the battery module 200.

The battery pack according to an embodiment of the present disclosure may be included in a vehicle such as an electric vehicle or a hybrid electric vehicle. That is, the vehicle according to an embodiment of the present disclosure may include the battery pack including at least one battery module 200 according to an embodiment of the present disclosure mounted on the vehicle body itself.

The terms indicating directions as used herein such as upper, lower, left, right, front and rear are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

[Description of Reference Numerals]

| | |
|---|---|
| 200: Battery module | 220: Busbar plate |
| 221: Body portion | C2: Gas vent |
| 224, 224a, 224b: Connection terminal, Positive electrode connection terminal, Negative electrode connection terminal | P1: Connection opening 227: Fuse portion 240: Second fixing member |
| 100: Cylindrical battery cell | H2: Discharge hole |
| 111, 112: Positive electrode terminal, Negative electrode terminal | |
| B1: Bent structure | |
| 210: Module housing | |
| 225: Connection portion | |
| 230: First fixing member | |
| 250: Thermal insulation member | |
| 260: Reinforcement member | |

INDUSTRIAL APPLICABILITY

The present disclosure relates to a battery module. In addition, the present disclosure can be used in the industry of electronic devices comprising the battery module.

What is claimed is:

1. A battery module, comprising:
a plurality of cylindrical battery cells arranged in a horizontal direction, the plurality of cylindrical battery cells including first cylindrical battery cells each having a positive electrode terminal and a negative electrode terminal respectively at a top and a bottom thereof, second cylindrical battery cells each having a negative electrode terminal and a positive electrode terminal respectively at a top and a bottom thereof, and each of the plurality of cylindrical battery cells including a gas vent through which the positive electrode terminal or the negative electrode terminal is opened to discharge an internal gas when an internal pressure is equal to or higher than a predetermined pressure; and
a busbar plate disposed on or below the plurality of cylindrical battery cells, and having a plate shape extending in the horizontal direction to cover the plurality of cylindrical battery cells, the busbar plate including:
a plurality of connection openings each of which is open in a vertical direction in an area in contact with a respective one of the positive or negative electrode terminals,
positive electrode connection terminals such that each positive electrode connection terminal extends from an edge of a respective connection opening and having the extended part in contact with a respective positive electrode terminal to electrically connect the plurality of cylindrical battery cells, and
negative electrode connection terminals such that each negative electrode connection terminal extends from the edge of a respective connection opening and having the extended part in contact with each negative electrode terminal to electrically connect the plurality of cylindrical battery cells, wherein the positive electrode connection terminal and the negative electrode connection terminal that are not in contact with the positive electrode terminal or the negative electrode terminal with the gas vent includes a fuse portion configured to blow when a current equal to or above a predetermined current flows from the cylindrical battery cell, the fuse portion having a bent structure that is bent in the horizontal direction at least once, wherein the busbar plate further includes an electrically insulating second fixing member having one side connected to the edge of a respective connection opening and the other side connected to part of the respective fuse portion to fix the fuse portion, and wherein at least part of a portion of the second fixing member extending from the edge of the connection opening to the part of the fuse portion has elasticity to pull the fuse portion by elastic recovery when the fuse portion blows.

2. The battery module according to claim 1, wherein each positive and negative connection terminal further includes a connection portion in direct contact with the respective positive electrode terminal or the negative electrode terminal of the cylindrical battery cell, and each fuse portion extends in the horizontal direction from the inner edge of the connection opening and an end in the extended direction is connected to one end of the connection portion.

3. The battery module according to claim 2, wherein the busbar plate further includes an electrically insulating first fixing member having one side connected to the inner edge of a respective connection opening and the other side connected to part of the connection portion to fix the connection portion.

4. The battery module according to claim 2, wherein the busbar plate further includes a thermal insulation member around an outer surface of each fuse portion.

5. The battery module according to claim 4, wherein the thermal insulation member is separated into at least two.

6. The battery module according to claim 4, wherein the thermal insulation member includes a discharge hole configured to discharge a melted part of the fuse portion.

7. The battery module according to claim 2, wherein the busbar plate further includes an electrically insulating reinforcement member around an outer surface of each fuse portion and is configured to melt at a predetermined temperature or above.

8. The battery module according to claim 7, wherein at least part of the fuse portion having the reinforcement member is bent in an arch shape.

9. The battery module according to claim 7, wherein the battery module further includes a module housing having receiving portions with a plurality of hollows to receive the plurality of cylindrical battery cells arranged in rows and columns in the horizontal direction, and among the plurality of cylindrical battery cells arranged in rows and columns, the fuse portion of the connection terminal in contact with the positive electrode terminal or the negative electrode terminal of the cylindrical battery cell disposed at an inner position in the horizontal direction has a larger width than the fuse portion of the connection terminal in contact with the positive electrode terminal or the negative electrode terminal of the cylindrical battery cell disposed at an outer position in the horizontal direction.

10. The battery module according to claim 1, wherein the bent structure is bent in opposite directions at least twice.

11. The battery module according to claim 1, wherein the bus bar plate further includes an external terminal electrically connected to the plurality of cylindrical battery cells at least in an area in which the connection opening is not formed.

12. The battery module according to claim 1, wherein each positive and negative connection terminal having the fuse portion includes at least two fuse portions, and the at least two fuse portions are spaced a predetermined distance apart from each other, and the at least two fuse portions have different horizontal widths.

13. A battery pack comprising at least one battery module according claim 1.

14. An electronic device comprising the battery pack according to claim 13.

* * * * *